(Model.) 2 Sheets—Sheet 1.

J. M. GRIEST.

COMBINED RUFFLER AND SHIRRER ATTACHMENT FOR SEWING MACHINES.

No. 306,742. Patented Oct. 21, 1884.

Witnesses:
Henry Frankfurter
W. L. Baker

Inventor:
John M. Griest
per F. F. Warner
his Attorney.

(Model.)
J. M. GRIEST.
COMBINED RUFFLER AND SHIRRER ATTACHMENT FOR SEWING MACHINES.
No. 306,742. Patented Oct. 21, 1884.
2 Sheets—Sheet 2.
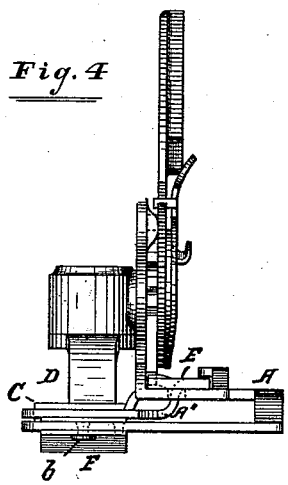
Fig. 4
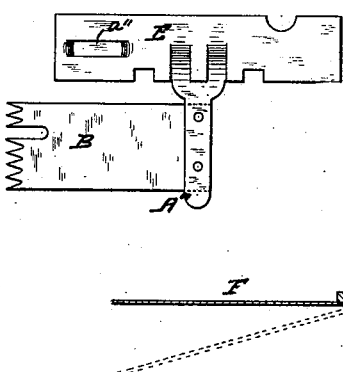
Fig. 5
Fig. 6
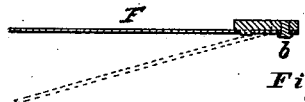
Fig. 7
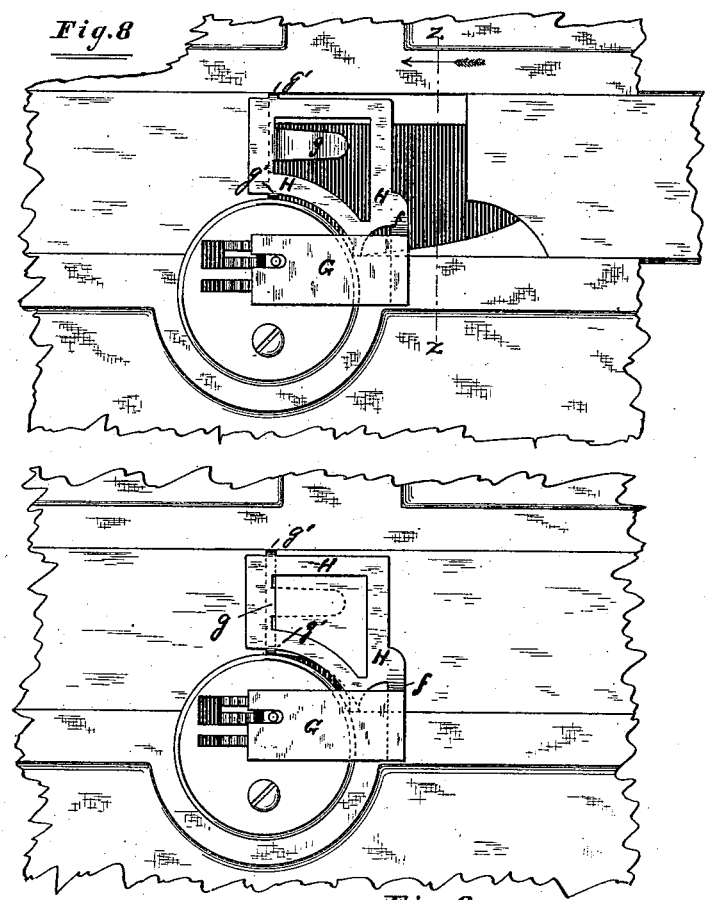
Fig. 8
Fig. 9
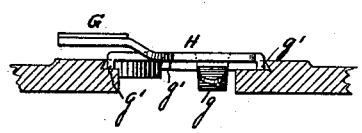
Fig. 10
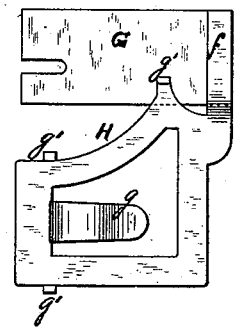
Fig. 11
Fig. 12
Witnesses:
Inventor:
John M. Griest
per F. F. Warner
his Attorney.

UNITED STATES PATENT OFFICE.

JOHN M. GRIEST, OF CHICAGO, ILLINOIS, ASSIGNOR TO THE CHICAGO ATTACHMENT COMPANY, OF SAME PLACE.

COMBINED RUFFLER AND SHIRRER ATTACHMENT FOR SEWING-MACHINES.

SPECIFICATION forming part of Letters Patent No. 306,742, dated October 21, 1884.

Application filed November 5, 1883. (Model.)

*To all whom it may concern:*

Be it known that I, JOHN M. GRIEST, residing at Chicago, in the county of Cook and State of Illinois, have invented certain new and useful Improvements in Combined Ruffler and Shirrer Attachments for Sewing-Machines, of which the following, in connection with the accompanying drawings, is a specification.

Figure 1:
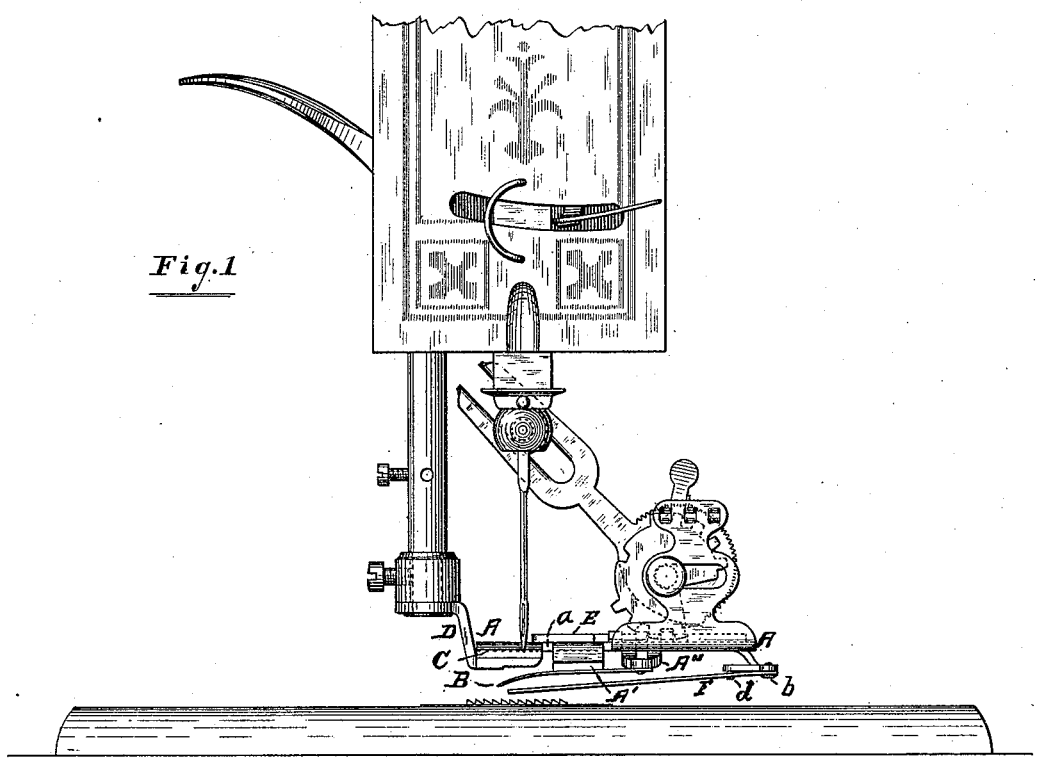
Figure 2:
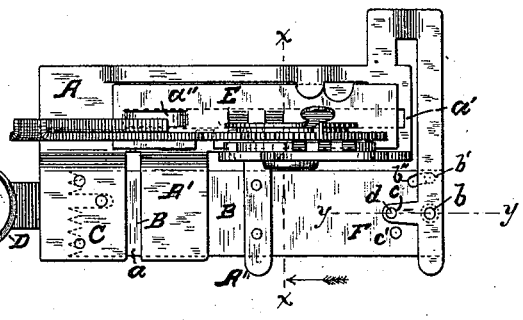
Figure 3:
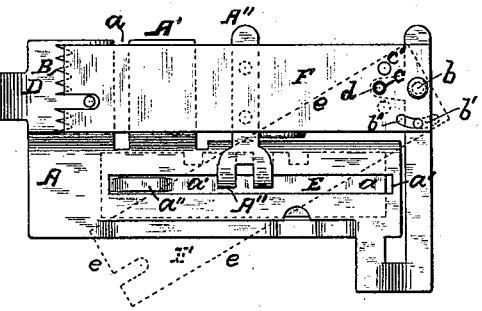

In the drawings, Figure 1 is a side elevation of a ruffler, showing certain of my improvements. Fig. 2 is a top view thereof. Fig. 3 is a bottom view of the same. Fig. 4 is an end view. Fig. 5 is a top view of the slide carrying the ruffling-blade. Fig. 6 is a sectional detail taken transversely through the base-plate and sliding plate at the line $x\,x$ of Fig. 2, and viewed in the direction indicated by the arrow there shown. Fig. 7 is a section in the plane of the line $y\,y$ of Fig. 2. Fig. 8 is a top view of the detachable separator-blade and its frame for use in shirring, and showing the position the same then occupies on the sewing-machine, the throat-plate being open. Fig. 9 is a like representation showing the throat-plate closed. Fig. 10 is a section in the plane of the line $z\,z$ of Fig. 8, viewed in the direction indicated by the arrow there shown. Fig. 11 is a bottom view of the detachable separator-blade and its holder or frame shown separately from the sewing-machine, and Fig. 12 is an edge view of the frame.

Like letters of reference indicate like parts.

With the exceptions hereinafter referred to, the attachment shown in the accompanying drawings is constructed substantially as specified in Letters Patent of the United States of America, No. 280,926, granted to me the 10th day of July, 1883. In the ruffler or gatherer shown and described in the said Letters Patent I attached to the main part or base-plate a presser-plate, a part of which served to hold the ruffling-blade down properly, and another part serving as a presser-foot, and between these parts was a space or opening for the introduction of the second band when two were used, and to enable the operator to see the plaits as delivered to the needle, as in making scalloped plaitings, and also furnished space in which the plaits were formed, as will fully appear on reference to the same Letters Patent. I now attain the results above referred to as follows: I make on the main part or base-plate A a lateral arm or extension, A', made in one and the same part or piece with said plate, and bent down at the junction of the said parts, as indicated, so that the said arm will overlap the ruffling-blade B and hold it down properly to its work. To another arm or extension, C, parallel to the arm A', and also made in one and the same part or piece with the base-plate, I attach a presser-foot, D, which is cut off, as shown, to have a space, $a$, between its end and the arm A'. By constructing the arm A' in this manner I deprive the sliding or reciprocating plate E of much of its former guard or bearing on one edge, and to compensate therefor I now slot the base-plate, as shown at $a'$, pass the arm A'' through the slot $a'$, and set down a portion, $a''$, of the plate E into the said slot, thus insuring a direct or steady movement of the plate E.

F is the separator plate or blade. This blade I now pivot to its arm by means of a stud or point extending from the said arm vertically through one end of the said plate, as shown at $b$, and $b'$ is a fixed stud or pin entering a slot, $b''$, in the blade F; also, in the blade F, I make two holes, $c$ and $c'$, and $d$ is a fixed stud or pin entering the hole $c$. By carrying the free or loose end of the blade F away from the ruffler-blade, as indicated by the dotted or broken lines in Fig. 7, it will also be carried from the stud $d$, and may then be turned laterally on its pivot, as indicated by the dotted or broken lines at $e\,e$, Fig. 3, so as to uncover or expose the working end of the ruffling-blade, as there represented, and by then releasing the blade it will be retained in that position temporarily, for the reason that the stud $d$ will then enter the hole $c'$. I desire to state, however, that a fixed stud, $b'$, will operate in the same manner in conjunction with two holes in the plate F. When the plate F is not turned to expose the ruffling-blade, the ruffling mechanism operates as described in the said Letters Patent; but when so turned the ruffler is adapted to engage in the work of shirring, as will hereinafter more fully appear.

G is a supplemental separator blade or plate which I employ in shirring, and H is a frame or holder to which I apply the said plate or blade. The holder H has an arm, $f$, to which the plate G is fastened, and $g$ is a tongue, and $g'$ $g'$ are lugs, on the said frame or holder, all of which are clearly represented in Figs. 11 and 12.

In shirring I turn the plate F to one side, as already described, and secure the presser-foot D to the presser-foot bar, as usual, or in any suitable way. I also open the shuttle-race slide, and arrange the frame or holder H in the said opening, as indicated in Fig. 8. I then close the shuttle-race slide, as indicated in Fig. 9. The said slide on being closed will move over the tongue $g$ and hold the holder H down, and the lugs $g'$ $g'$ will prevent the said holder from being turned laterally out of its proper place, as will be perceived on reference to Figs. 9 and 10. The blade or plate G will thus be held detachably, but firmly, in its proper place for shirring.

It will be perceived that when the ruffling or gathering mechanism and the plate G are thus applied to the sewing-machine (the separator F being turned aside as described) the gathers or plaits may be made with facility at any desired distance from the edges of the goods or in the middle of a broad piece of cloth, thus shirring the goods operated upon. It will also be perceived that shirring may be done without the plate G, though not with so good advantage as with it, the separator F being turned aside as described.

Having fully described my invention, what I claim as new, and desire to secure by Letters Patent, is—

The combination, in a ruffler and shirrer, of a pivoted separator plate or blade having two or more openings therein in the arc of a circle having the pivotal point as a center, and a fixed stud or pin adapted and arranged to enter the said openings alternately, for the purpose of thereby temporarily retaining the said blade in its different positions, substantially as specified.

In testimony that I claim the foregoing as my own I hereto affix my signature in presence of two witnesses.

JOHN M. GRIEST.

Witnesses:
F. F. WARNER,
J. B. HALPENNY.